United States Patent [19]

Bouricius et al.

[11] 3,736,569

[45] May 29, 1973

[54] SYSTEM FOR CONTROLLING POWER CONSUMPTION IN A COMPUTER

[75] Inventors: Willard G. Bouricius, Katonah; Donald C. Jessep, Jr., Pound Ridge, both of N.Y.; William C. Carter, Ridgefield, Conn.; Aspi B. Wadia, Chappaqua, N.Y.

[73] Assignee: International Business Machines Corporation, Armonk, N.Y.

[22] Filed: Oct. 13, 1971

[21] Appl. No.: 188,922

[52] U.S. Cl. .................................340/172.5, 340/173

[51] Int. Cl. .................................................G06f 9/06

[58] Field of Search ...................340/172.5, 173, 174; 235/153

[56] References Cited

UNITED STATES PATENTS

| | | | |
|---|---|---|---|
| 3,535,560 | 10/1970 | Cliff | 340/172.5 |
| 3,577,130 | 5/1971 | Rice et al. | 340/172.5 |
| 3,505,573 | 3/1970 | Wiedmann | 340/173 R |
| 3,588,846 | 6/1971 | Linton et al | 340/173 FF |
| 3,585,608 | 6/1971 | Osborne | 340/173 |
| 3,426,331 | 2/1969 | Joyce | 340/172.5 |
| 3,478,286 | 11/1969 | Dervan | 340/172.5 |
| 3,517,171 | 6/1970 | Avizienis | 340/172.5 |
| 3,528,061 | 9/1970 | Zurcher, Jr. | 340/172.5 |
| 3,573,743 | 4/1971 | Hadd et al. | 340/172.5 |

*Primary Examiner*—Paul J. Henon
*Assistant Examiner*—John P. Vandenburg
*Attorney*—Isidore Match, Murray Nanes and J. Jancin, Jr.

[57] ABSTRACT

The disclosed system causes power to be removed from the memory for a chosen time duration after each time that the memory is used. The time duration can be chosen as desired and is specified by a "WAIT N" instruction. When this instruction appears, the power to the memory is removed therefrom and accesses to the memory are prevented. The time duration is entered into a register and the contents of this register are compared with the contents of a counter which has a clock pulse train applied thereto until equality is attained whereby an equality signal issues. The latter signal is applied to restore power to the memory and, with appropriate logic, permits accesses to the memory, read or write, for example. When the memory accessing is completed, the N units specified by the "WAIT N" instruction would be usable at the option of the program to control access to the memory and to remove power therefrom for the duration of N time units. A new "WAIT N" instruction can change the time duration.

6 Claims, 4 Drawing Figures

INVENTORS
WILLARD G. BOURICIUS
WILLIAM C. CARTER
DONALD C. JESSEP, JR.
ASPI B. WADIA

BY Isidore Match
ATTORNEY

Patented May 29, 1973 3,736,569

2 Sheets-Sheet 2

SYSTEM FOR CONTROLLING POWER CONSUMPTION IN A COMPUTER

BACKGROUND OF THE INVENTION

This invention relates to general purpose computers. More particularly, it relates to a novel arrangement for the enabling of a power saving in the operation of such computers.

It is well known that the operation of main store in a general purpose computer is the one which requires most of the power in the running of the computer, particularly, a computer constructed with low-power logic elements. Clearly, energy could, therefore, be saved in substantial amounts if it were to be made possible to power up and then power down the main store under the option of program control, for example.

Accordingly, it is an important object of this invention to provide means for enabling the powering up and then the powering down of main store.

It is another object to provide means for enabling the powering up and then the powering down of main store under program control, the latter means constituting an arrangement for providing an instruction to carry out the powering control, and the execution of such instruction.

It is a further object to provide means as set forth in the preceding objects which is operative in conjunction with a chosen method of main store operation and which also prevents accesses to main store during the time that it is powered down.

SUMMARY OF THE INVENTION

In accordance with the invention, there is provided a system for controlling the power consumption in a computer having a memory. The system comprises means for providing an instruction in the computer which specifies a chosen time duration. First means are included responsive to the instruction for causing electrical power to be removed from the memory at the initiation of the duration and to be supplied to the memory at the termination of the duration. There are provided second means responsive to the first means for preventing the accessing of the memory during the specified duration. The first means can comprise a register for receiving thereinto, the time duration information of the instruction, a counter adapted to receive a pulse train thereinto and comparing means responsive to the contents of the register and the counter for providing an equality signal when the counter and register contents are equal, the equality signal occurring at the termination of the duration. The second means suitably comprises means responsive to the equality signal and accessing signals for the memory for enabling the accessing of the memory only at the occurrence of the equality signal.

The foregoing and other objects, features and advantages of the invention will be apparent from the following more particular description of the preferred embodiments of the invention, as illustrated in the accompanying drawings.

DESCRIPTION OF A PREFERRED EMBODIMENT

Figure 1:
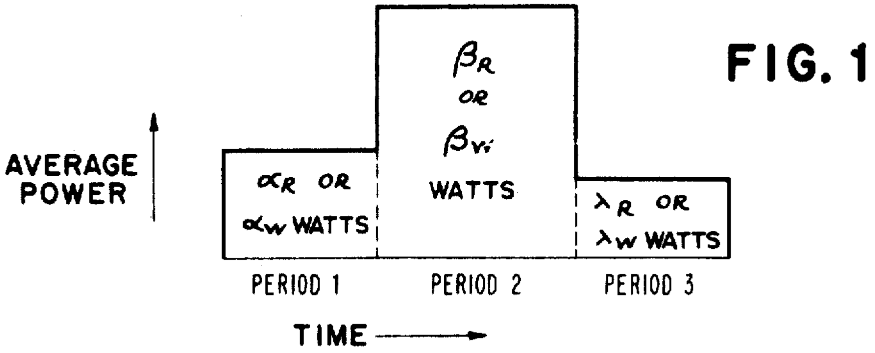
FIG. 1 is a power histogram of a computer memory.

In FIG. 1, there is shown the power histogram for the operation of the main store in a general purpose computer which operates in three periods. In period one, the main store is powering up and uses $\alpha_R$ or $\alpha_W$ watts, depending upon whether it is going to read or write. In period 2, the main store is being utilized and uses $\beta_R$ or $\beta_W$ watts depending upon whether it is reading or writing. In period 3, it is powering down and uses $\lambda_R$ or $\lambda_W$ watts depending upon whether it has read or written. After period 3, main store is turned off and uses no standby power.

Figure 3:
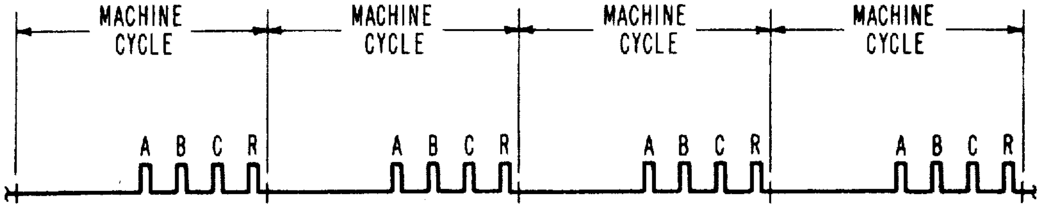
FIGS. 3 and 4 comprise a timing diagram of significant pulses and cycles occurring during the operation of the embodiment depicted in FIG. 2.
Figure 4:
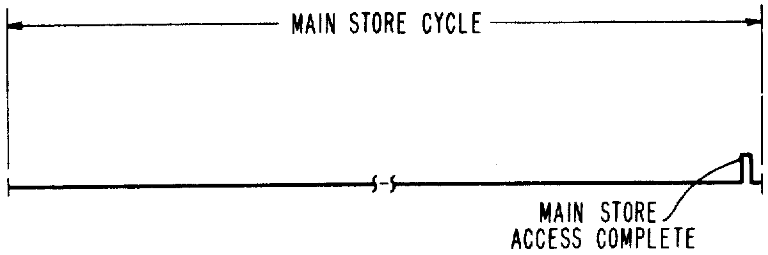
Figure 2:
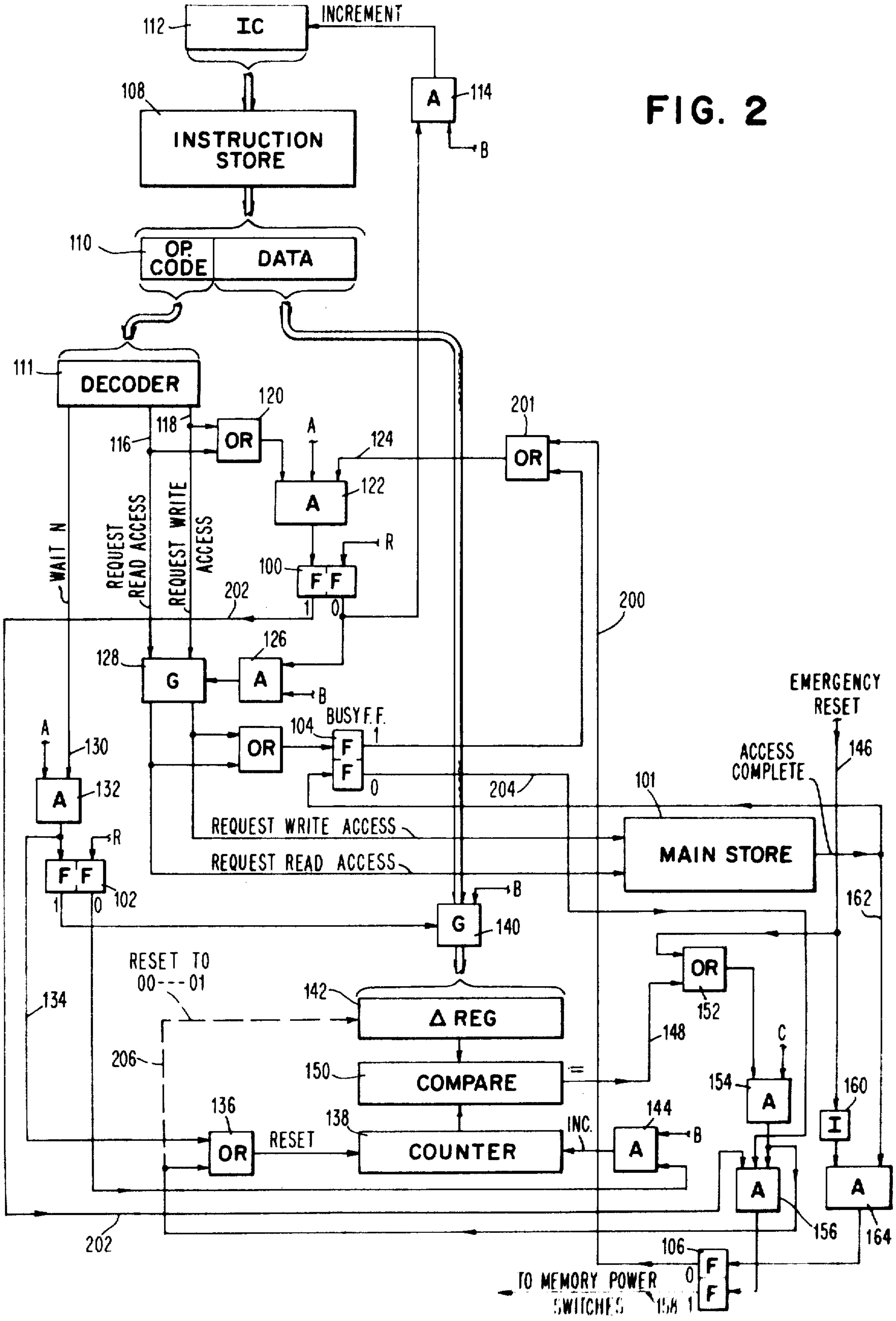
FIG. 2 is a diagram of a preferred embodiment constructed in accordance with the principles of the invention.

Reference is now made to FIG. 2 wherein there is shown a preferred embodiment of the inventive concept. FIGS. 3 and 4 comprise a timing diagram of pertinent waveforms which occur during the operation of the embodiment shown in FIG. 2.

In this embodiment, a relatively low power instruction store stage 108 is provided. Instruction store 108 loads a microinstruction into a register 110 every machine cycle, the machine cycles being depicted in FIG. 3. This microinstruction is valid by A pulse time (FIG. 3) in the machine cycle and its OP. code can thus be sampled by the A pulse. As seen in FIG. 3, B, C and R pulses are also provided during each machine cycle as is further explained hereinbelow.

Instruction store 108 is addressed by an instruction counter 112 which is normally incremented by the B pulse during each machine cycle. As shown in FIG. 2, a B pulse is applied as one of the inputs to an AND circuit 114. Therefore, upon the enabling of AND circuit 114, the B pulse passes therethrough to be applied to counter 112. The other input to AND circuit 114 is the reset output of a flip-flop 100. Thus, for the B pulse to be effective, flip-flop 100 must be in its "0" state. As will be seen further hereinbelow, flip-flop 100 is set to its "1" state by the A pulse under particular conditions.

If the main store 101 is not available when the signal (main store request for access) is initiated, the instruction to be performed has to be inhibited until main store 101 is available. A main store request for access is indicated by the active state of either a line 116 or 118, both of these lines being from a decoder 111 which decodes the OP code portion of the instruction in register 110. Both of lines 116 and 118 are applied as inputs to an OR circuit 120. Thereby, if either of these lines are in their active states, an output is produced from OR circuit 120 which is provided as an input to an AND circuit 122. The other inputs to AND circuit 122 are the A pulse and the active state of a line 124. If line 124 is active at A time, then AND circuit 122 is enabled and the A pulse accordingly will pass therethrough to set flip-flop 100 to its "1" state. The "1" state of flip-flop 100 prevents the B pulse from being produced as an output of an AND circuit 126 whereby the gate 128 to which lines 116 and 118 are applied as inputs is not enabled. Consequently, the request for access is prevented from reaching main store 101. Concurrently, the B pulse cannot be produced as an output of AND circuit 114, also because flip-flop 100 is in its "1" state. Because of these conditions, instruction counter 112 is not incremented and the instruction will therefore be initiated on the next machine cycle.

It has been mentioned above that a main store request for access has to be repeated if AND circuit 122 is enabled by the active state of line 124. Line 124 is caused to be activated through two occurrences. The first of these occurrences is the "1" state of a "busy" flip-flop 104. The second of these occurrences is the "0" state of a flip-flop 106. Flip-flop 104 may be in its "1" state because of a previous main store access which has, as yet, not been completed. Flip-flop 106 may be in its "0" state because the required "WAIT" time of N units between main store accesses has not completely elapsed.

The decoding of the WAIT "N" instruction from the OP code portion of register 110 results in the active state of a line 130 from decoder 111. Line 130 is applied to an AND circuit 132, the other input to AND circuit 132 being the A pulse. Thus, at A pulse time in the presence of the "WAIT N" instruction, AND circuit 132 is enabled to produce an output to set a flip-flop 102 to its "1" state. The output of AND circuit 132 is also applied via a line 134 to an OR circuit 136. With OR circuit 136 enabled by the active state of line 134, its output is operative to reset a counter 138 to 0.

With flip-flop 102 in its "1" state, a gate 140 is enabled, the other inputs to gate 140 being the data portion of the instruction contained in register 110 and the B pulse. The B pulse in this situation is operative to gate the data portion to a register 142. The contents of the data portion is the number of machine cycles that have to occur before main store 101 can again be accessed, such number being pre-chosen as has been explained hereinabove.

During the cycle in which the "WAIT N" instruction is executed, AND circuit 144 is not enabled since flip-flop 102 is in its "1" state and, therefore, the B pulse is not effective to increment counter 138. Flip-flop 102 is reset to its "0" state by the R pulse at the end of this cycle whereby AND circuit 144 is enabled to permit the B pulse to increment counter 138.

When a main store access is complete, flip-flop 104 is reset to its "0" state. In this situation, unless the "emergency reset" line 146 is active, an AND circuit 164 is enabled whereby active access complete line 162 can reset flip-flop 106 to its "0" state.

When the contents of counter 138 are equal to those of a register 142 whereby compare unit 150 finds equality, then the output line 148 of compare unit 150 is active, the signal on line 148 passing through an OR circuit 152 to be applied as an input to an AND circuit 154. At C pulse time, AND circuit 154 is enabled to produce an output which is applied as an input to an AND circuit 156, the other input to AND circuit 156 being the set output of flip-flop 100. Thus, with flip-flop 100 in its "1" state, AND circuit 156 is enabled to produce an output that sets flip-flop 106 to its "1" state, the "1" output of flip-flop 106 activating a line 158 which goes to the power switches to turn them on to enable the powering of main store 101 so that it can be used on the next machine cycle. The arrangement and logic whereby line 158 controls the power switches is believed to be obvious to those skilled in the art and its depiction and explanation is accordingly believed to be unnecessary.

When AND circuit 154 is enabled, the C pulse is operative to pass through OR circuit 136 to reset counter 138.

The "WAIT" instruction mechanism can be bypassed by the emergency reset signal which activates line 146. The active state of this line passes through OR circuit 152 and together with the C pulse, enables AND circuit 154 whereby AND circuit 156 is enabled during the set state of flip-flop 100 to set flip-flop 106 to its set state if a main store access is needed. Thereafter, flip-flop 106 remains in its "1" state until the emergency reset signal is removed. When line 146 is not active, an inverter 160 produces an output whereby the next access complete signal on line 162 enables AND circuit 164 to reset flip-flop 106 to its 0 state.

In further considering the operation of the embodiment depicted in FIG. 2, it is to be realized that a main store request for access has to be repeated at least once. In the case where the request is repeated only once, the contents of Δ register have to be equal to the contents of counter 138 in the same cycle that the main store request for access is made and the main store has to be available. This requires the situation where both flip-flops 104 and 106 are both in their "0" states. The latter situation signifies that main store is not busy and that the power switches are "off." Line 200 which extends from the reset output terminal of flip-flop 106 to an input to OR circuit 201 is active which, in turn, renders line 124 active. At A pulse time, flip-flop 100 will be set to its "1" state to thereby activate line 202. The AND circuit 114 will not be enabled at B pulse time and consequently instruction counter 112 will not be incremented. Line 204 which extends from the reset output terminal of flip-flop 104 to an input to AND circuit 156 will be active.

At B pulse time, line 148 becomes active thereby permitting AND circuit 154 to be enabled at C pulse time. Because both lines 202 and 204 are active at C pulse time, AND circuit 1.56 is enabled to produce an output which switches flip-flop 106 to its "1" state to thereby turn on the memory power switches. It is to be noted that when line 200 becomes inactive, i.e., flip-flop 106 is in its "1" state, line 124 also becomes inactive. This state of events signifies that on the next machine cycle, the A pulse will not pass through AND circuit 122 to set flip-flop 100 to its "1" state. The B pulse, however, will pass through AND circuit 126 to gate the request for access to main store 101 and also to set busy flip-flop 104 to its "1" state. The main store access will now continue for several machine cycles. It is to be noted that on the machine cycle following the one in which the main store access request was gated to main store 101, a new micro instruction will appear in register 110. If this micro instruction is something other than a request for main store access, it is intended that it be executed in the usual manner. However, if this micro instruction is another request for main store access, it will be forced to recycle until the memory is available. This situation obtains because flip-flops 104 and 106 are both in their "1" states. When the memory access is complete, both flip-flops 104 and 106 will be reset to "0."

The request for main store access will continue to be repeated each machine cycle including the cycle which follows the cycle in which line 148 becomes active. Such actions take place because, as long as flip-flop 106 is in its "0" state, lines 200 and 124 will be active thereby signifying that flip-flop 100 will be set to its "1" state each machine cycle.

In the machine cycle that the contents of counter 138 become equal to the contents of Δ register 142, line 148 becomes active and thereby enables AND circuit 154 to permit the C pulses to pass therethrough to be applied to AND circuit 156. AND circuit is enabled because both of lines 202 and 204 are active. The consequent output of AND circuit 156 sets flip-flop 106 to its "1" state to thereby cause line 200 to become inactive. On the next machine cycle, the A pulse cannot get through AND circuit 122 to set flip-flop 100 to its "1" state. The B pulse will be effective through AND circuit 126 to gate the request to main store 101. It is recalled that main store was powered up on the previous cycle when flip-flop 106 was set to its "1" state.

In the event that a "WAIT N" instruction is provided where the value of N is chosen to be 00---001, a compare signal will be caused to be produced on line 148 in each machine cycle. This is because the B pulse increments counter 138 every machine cycle. Such choice of the value of N will consequently permit a main store access to be obtained in any machine cycle that main store 101 is available.

The inclusion of line 204 provides the capability for repeating a request for main store access if the memory is busy because of a previous access. Another way to provide this capability would be to provide a micro instruction prior to the request for main store access which would test for the state of busy flip-flop 104 and continue looping until flip-flop 104 was in its "0" state.

By adding line 206 (shown in dashed line), the "WAIT N" instruction can be rendered effective for only one "N" interval. At the end of the interval, counter 138 is reset to 00---00 and Δ register is reset to 00---01. Because the B pulse increments counter 138, each machine cycle, a compare signal will appear on line 148 every cycle. This will permit a main store access to be obtained in any machine cycle that main store 101 is available. It is to be noted that, where line 206 is utilized, the emergency reset signal on line 146 has the same effect as the active state of line 148. In other words, the "WAIT N" instruction could be terminated by the application of the emergency reset signal and, thereafter, a main store access could succeed any machine cycle in which main store 101 is available.

In considering the inventive concept, if a read or write access request for main store does not appear before kN time units have elapsed since the memory was used ($k>0$) and appears before ($k+1$) N time units have elapsed, main store will be directly available, i.e., it will be available once an interval of N has elapsed since it was last used.

A new instruction "WAIT $N_1$" can be employed to change the WAIT period. The term $N_1 = 0$ can be taken to signify the maximum speed but, even in such case, the main store may be powered up and down in each case, as specified by the power histogram depicted in FIG. 1.

As a modification of the system, there may be utilized the alternative of not powering down after a store instruction since a store instruction is followed by a read to obtain the next instruction. Such arrangement can save a little power without complicating the controls.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A system for controlling the power consumption in a computer having a memory comprising:
- means for enabling said memory to be accessed for successively occurring (operations) only after respective predetermined time periods between said operations;
- means for providing instructions in said computer which specify the durations of said periods; and
- means responsive to said instructions and to the initiation and completion of a memory access for respectively causing the supplying of electrical power to and the removing of electrical power from said memory.

2. A system as defined in claim 1 wherein the durations of said time periods specified by said instructions are varied.

3. A system as defined in claim 2 wherein said memory access enabling means includes means for enabling a read access to said memory;
- means for enabling a write access to said memory, and
- means for enabling both read and write accesses to said memory.

4. A system for controlling the power consumption in a computer having a memory comprising:
- means for providing instructions in said computer which specify a chosen time duration;
- first means responsive to said instructions for causing electrical power to be removed from said memory at the initiation of said duration and to be supplied to said memory at the termination of said duration; and
- second means responsive to said first means for preventing the accessing of said memory during said duration.

5. A system as defined in claim 4 wherein said first means comprises:
- a register for receiving thereinto said time duration information from said instructions;
- a counter adapted to be cycled by pulses applied thereto;
- comparing means responsive to the contents of said register and said counter for providing an equality signal when said counter and register contents are equal, said equality signal occurring at the termination of said duration.

6. A system as defined in claim 5 wherein said second means comprises means responsive to said equality signal and accessing signals for said memory for enabling the accessing of said memory at the occurrence of said equality signal.

* * * * *